(12) United States Patent
Roit et al.

(10) Patent No.: US 9,601,222 B2
(45) Date of Patent: Mar. 21, 2017

(54) EMERGENCY FLUID SOURCE FOR HARSH ENVIRONMENTS

(75) Inventors: Willard J. Roit, Campbell, CA (US); Martin F. Badewitz, Jr., Wilmington, NC (US)

(73) Assignee: GE-Hitachi Nuclear Energy Americans LLC, Wilmington, NC (US)

( * ) Notice: Subject to any disclaimer, the term of this patent is extended or adjusted under 35 U.S.C. 154(b) by 112 days.

(21) Appl. No.: 12/629,337

(22) Filed: Dec. 2, 2009

(65) Prior Publication Data
US 2011/0126928 A1    Jun. 2, 2011

(51) Int. Cl.
*G21C 9/00* (2006.01)
*G21D 1/02* (2006.01)

(52) U.S. Cl.
CPC ............... *G21D 1/02* (2013.01); *Y02E 30/40* (2013.01); *Y10T 137/8593* (2015.04)

(58) Field of Classification Search
USPC .............................. 376/277, 282, 283; 222/5
See application file for complete search history.

(56) References Cited

U.S. PATENT DOCUMENTS

| | | | |
|---|---|---|---|
| 4,083,187 A * | 4/1978 | Nagashima | ...................... 60/407 |
| 4,174,049 A | 11/1979 | Bolen | |
| 5,149,290 A | 9/1992 | Reveen | |
| 5,399,159 A | 3/1995 | Chin et al. | |

FOREIGN PATENT DOCUMENTS

| | | |
|---|---|---|
| JP | 1061692 A | 3/1989 |
| JP | 3113396 A | 5/1991 |
| JP | 2000002782 A | 1/2000 |

OTHER PUBLICATIONS

XP-002635560, Database WPI, Week 198428, Thomson Scientific, London, GB, & JP 59 019892A (Tokyo Shibaura Denki KK) Feb. 1, 1984.
EP Search Report issued in connection with corresponding EP Application No. 10193000.6, May 17, 2011.

* cited by examiner

Primary Examiner — Marshall O'Connor
(74) Attorney, Agent, or Firm — Ryan Alley IP

(57) ABSTRACT

The present invention takes the form of an apparatus or system that provides an alternate source of the pneumatic fluid to a system inside containment of a nuclear powerplant. An embodiment of the present invention may provide a nearly radiation-proof and nearly leak-proof, pneumatic fluid supply for some systems of the nuclear powerplant. These systems may include, but is not limited to, actuators, valves, and the like. An embodiment of the present invention may comprise a device that may propel an object with a sufficient force to puncture a seal of a pressure vessel. The released pneumatic fluid may be ported to an actuator, valve, or the like, for immediate operation of a system of the nuclear powerplant. Alternately, in an embodiment of the present invention, the pneumatic fluid may be used to resupply a depleted accumulator, or the like.

15 Claims, 8 Drawing Sheets

Prior Art

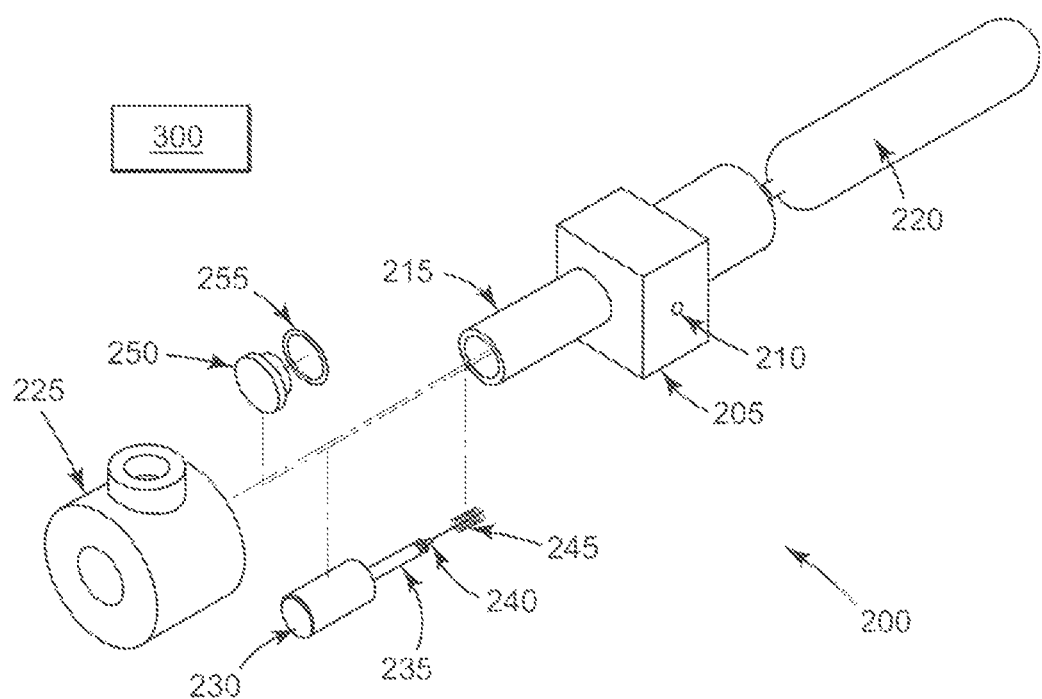

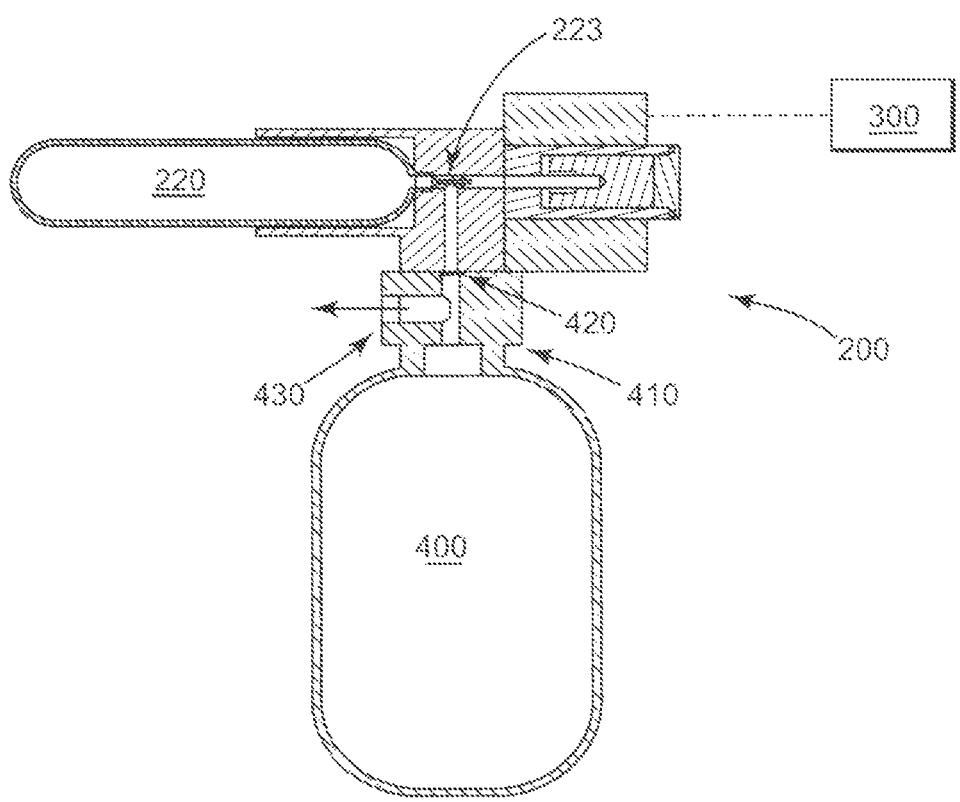

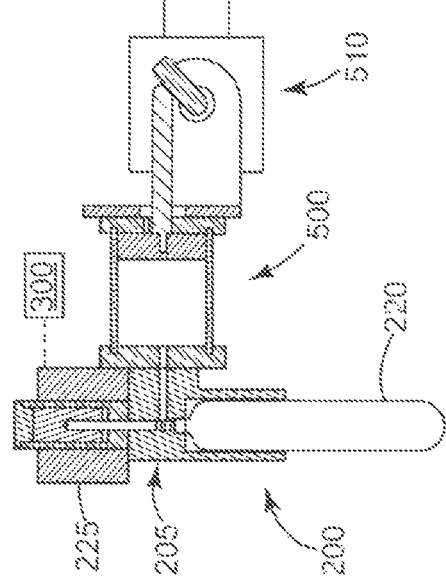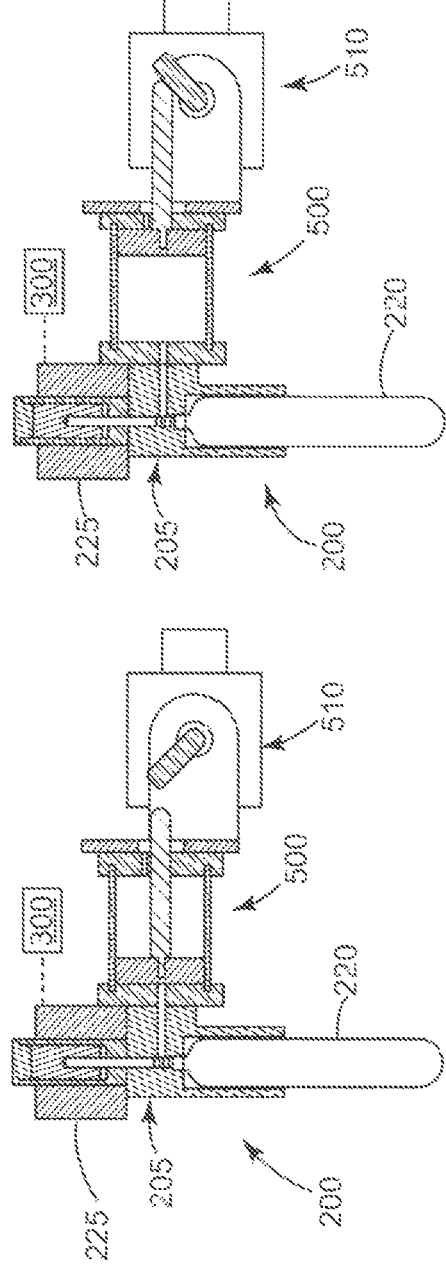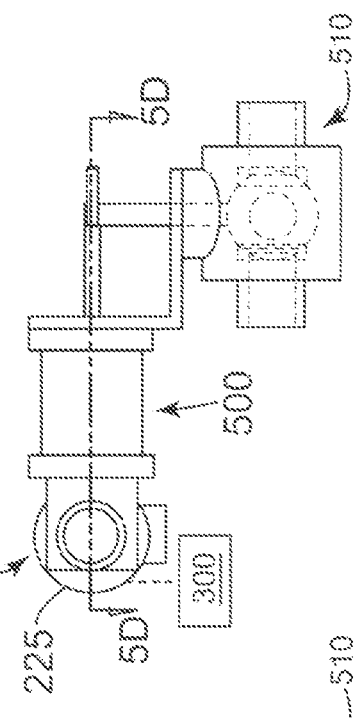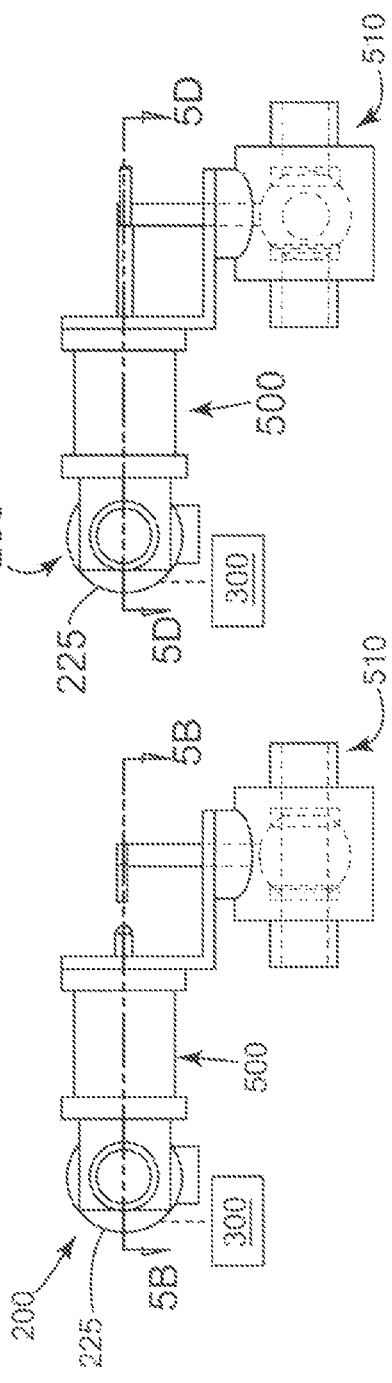

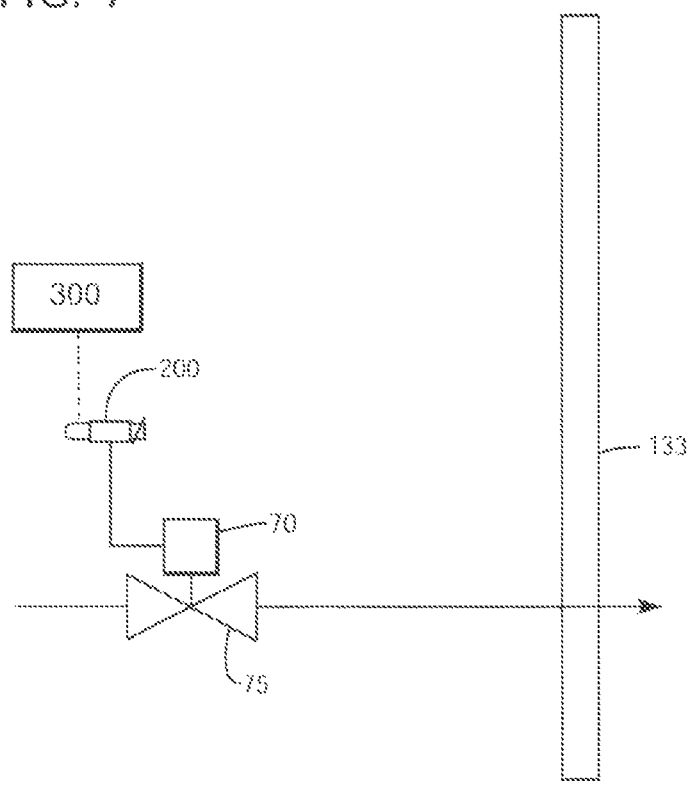

EMERGENCY FLUID SOURCE FOR HARSH ENVIRONMENTS

BACKGROUND OF THE INVENTION

The present invention relates generally to the pneumatic supply systems of a nuclear powerplant; and more particularly to a system for providing an emergency pneumatic supply to air operated devices used in the nuclear plant.

FIG. 1 is a schematic, illustrating an environment within which an embodiment of the present invention operates. Specifically, FIG. 1 illustrates a non-limiting example of a known pneumatic supply system used to operate an air-operated valve 75 located inside a containment building 130 (hereinafter "inside containment") of the nuclear power plant 10. As illustrated in FIG. 1, pneumatic fluid for operation of an air-operated valve 75 may be provided from either a pressurized tank 15, which stores for example, but not limiting of, nitrogen; or from an air compressor 20. A pressure regulator 25 typically controls the operating pressure of the pneumatic fluid. A valve 30 adjacent the containment wall 133 may be manually closed to prevent a loss of pneumatic pressure in the system when either: the pressurized tank 15, or the air compressor 20 is not available.

A pneumatic system pipeline passes through a penetration in a containment wall 133. A check valve 35 generally serves to reduce the chance of potentially radioactive gases from inside containment 130 from escaping through the containment wall 133. The downstream pneumatic pipeline 45 may be a relatively long length of pipe that may be accidentally damaged inside containment 130. A restricting flow orifice 40 serves to limit the flow of the pneumatic fluid inside containment 130, if the pipeline 45 ruptures downstream of the orifice 40. Check valve 50 is provided just upstream of accumulator 55, and serves to prevent a loss of pressure from the accumulator 55 if the long pipeline 45 ruptures.

The accumulator 55 is generally sized to ensure that sufficient pneumatic fluid is supplied for operating the valve 75. The accumulator 55 is considerably larger than is required for operation of the valve 75, allowing for loss from pneumatic fluid leakage through the check valve 50, the relief valve 60, or the solenoid valve 65, if the pneumatic system malfunctions. A relief valve 60 generally serves to protect the system from an over-pressurization if the pressure regulator 25 does not adequately control the pressure; or from over-pressurization due to higher than normal temperatures near the accumulator 55.

Operationally, when the solenoid valve 65 is opened, pneumatic fluid is routed to the air-operator 70 to move the valve 75. The air-operator 70 may be of any type including, but not limiting to, a diaphragm, a bellows, a piston, or the like. The valve 75 may be of any type, including, but not limiting to, a gate valve, a globe valve, a ball valve, an air damper, or the like. The valve 75 may be designed to open or close after an accident within the nuclear powerplant 10.

There are a few possible problems with the currently known pneumatic supply systems. The current systems require substantial piping and isolation devices. Installation, maintenance, and operation of these systems generally require accumulators, containment penetrations, and excessive valving configurations to guard against leaks between the areas inside containment 130 and outside containment 135. These systems also require longer installation and maintenance time; which can possibly expose operators to longer periods of radioactivity.

Based on the above discussion, an operator of a nuclear powerplant 10 may desire a system that provides an emergency pneumatic source to a component, such as, but not limiting of, a valve 75, within an area inside containment 130. The system should be locatable inside containment 130 and remotely operable. The system should require fewer components than currently known systems.

BRIEF DESCRIPTION OF THE INVENTION

In accordance with an embodiment of the present invention, an apparatus for supplying a pneumatic fluid to a system within a containment area of a nuclear powerplant, the apparatus comprising: a body mechanism configured for receiving and directing a pneumatic fluid to a component of a system located within a containment area of a nuclear powerplant, the body mechanism comprising: a discharge port configured for directing the pneumatic fluid away from the body mechanism; a supply port configured for receiving the pneumatic fluid from a source; wherein the supply port comprises a seal adapted for substantially barring the pneumatic fluid from flowing towards the discharge port; a guide tube configured for directing a position of an instrument; wherein the instrument slidably moves through portions of the guide tube and engages the seal; an operational chamber configured for directing the pneumatic fluid from the supply port to the discharge port; and an actuating device for moving the instrument; wherein the body mechanism and the actuating device are located within a containment area of a nuclear powerplant and collectively operate as a source of pneumatic fluid to at least one system of the nuclear powerplant.

In accordance with another embodiment of the present invention, an emergency fluid supply system operable within a containment area of a nuclear powerplant, the system comprising: a nuclear power plant comprising a containment area within which a boiling water reactor operates; a recirculation system comprising a pneumatic valve, wherein the pneumatic valve receives an air supply from a primary fluid source; an emergency pneumatic supply system configured for providing an additional air supply when required; wherein the emergency fluid system is located within the containment area and comprises: a body mechanism configured for receiving and directing a pneumatic fluid to a component of a system located within a containment area of a nuclear powerplant, the body mechanism comprising: a discharge port configured for directing the pneumatic fluid away from the body mechanism; a supply port configured for receiving the pneumatic fluid from a source; wherein the supply port comprises a seal adapted for substantially barring the pneumatic fluid from flowing towards the discharge port; a guide tube configured for directing a position of an instrument; wherein the instrument slidably moves through portions of the guide tube and engages the seal; an operational chamber configured for directing the pneumatic fluid from the supply port to the discharge port; and an actuating device for moving the instrument.

BRIEF DESCRIPTION OF THE DRAWING

FIG. 2 is a schematic, illustrating an exploded isometric view of an emergency pneumatic supply system, in accordance with an embodiment of the present invention.

FIG. 3, are schematics illustrating an elevation view, partially in cross-section, of the emergency pneumatic supply system of FIG. 2, in accordance with an embodiment of the present invention.

FIG. 4 is a schematic, illustrating an elevation view, partially in section of the emergency pneumatic supply system of FIG. 1 integrated with a first nuclear powerplant system, in accordance with an embodiment of the present invention.

FIGS. 6A-6D, collectively FIG. 6, are schematics illustrating plan and sectional views of the emergency pneumatic supply system of FIG. 1 integrated with a second nuclear powerplant system, in accordance with an embodiment of the present invention.

FIG. 7 is a schematic, illustrating an alternate embodiment of the emergency pneumatic supply system within the environment illustrated in FIG. 1.

DETAILED DESCRIPTION OF THE INVENTION

Figure 1:
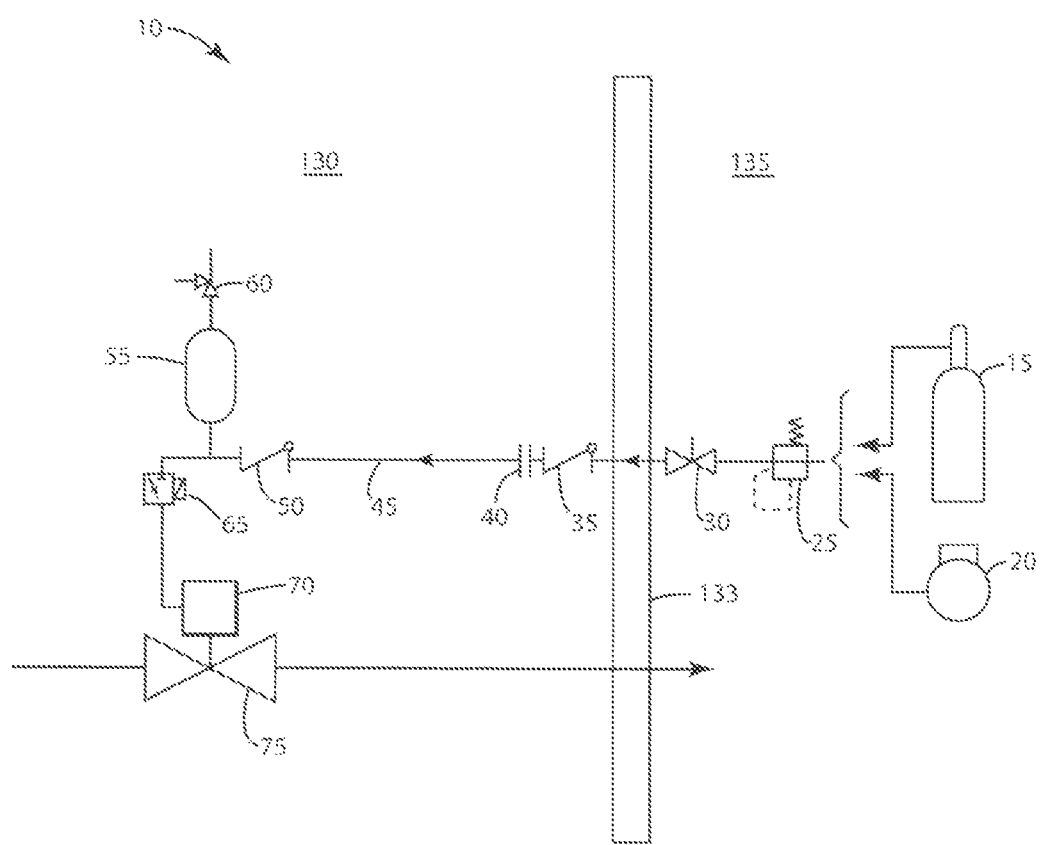
FIG. 1 is a schematic, illustrating an environment within which an embodiment of the present invention operates.

Certain terminology may be used herein for convenience only and is not to be taken as a limitation on the invention. For example, words such as "upper", "lower", "left", "front", "right", "horizontal", "vertical", "upstream", "downstream", "fore", and "aft" merely describe the configuration shown in the FIGS. Indeed, the components may be oriented in any direction and the terminology, therefore, should be understood as encompassing such variations unless specified otherwise.

As used herein, an element or step recited in the singular and preceded with "a" or "an" should be understood as not excluding plural elements or steps, unless such exclusion is explicitly recited. Furthermore, references to "an embodiment" of the present invention are not intended to exclude additional embodiments incorporating the recited features.

The following discussion focuses on an embodiment of the present invention integrated with a nuclear powerplant 10. Other embodiments of the present invention may be integrated with other systems that provide an emergency pneumatic supply system for a component and/or system operating in a harsh environment.

The present invention takes the form of an apparatus or system that may provide an alternate source of the pneumatic fluid to a system inside containment 130 of a nuclear powerplant 10. An embodiment of the present invention may provide a nearly radiation-proof and nearly leak-proof, pneumatic fluid supply for some systems of the nuclear powerplant 10. These systems may include, but is not limited to, actuators, valves, and the like.

An embodiment of the present invention provides an emergency or secondary source of pneumatic fluid, when needed. An embodiment of the present invention may comprise a device that may propel an object with a sufficient force to puncture a seal of a pressure vessel. The released pneumatic fluid may be ported to an actuator, valve, or the like, for immediate operation. Alternately, in an embodiment of the present invention, the pneumatic fluid may be used to resupply a depleted accumulator, or the like.

An embodiment of the present invention may provide a new and improved emergency pneumatic supply system 200. Here, the components of the emergency pneumatic supply system 200 may be located inside containment 130. Referring again to the FIGS., where the various numbers represent like parts throughout the several views. FIG. 2 is a schematic, illustrating an exploded isometric view of an emergency pneumatic supply system 200, in accordance with an embodiment of the present invention. In an embodiment of the present invention, the emergency pneumatic supply system 200 may comprise an assembly having: a body 205; a pressure vessel 220, such as, but not limiting of, a hermetically sealed pressurized cylinder with a metal seal 222; a solenoid coil 225; a core 230, a cap 250, a cap seal 255, and a control system 300.

The body 205 may be considered a mechanism that may be configured for receiving pneumatic fluid from a source, such as, but not limiting of, a pressurized cylinder 220. The body 205 may then direct the pneumatic fluid from the source to a component of a system inside containment 130, as described, or a component outside containment (not illustrated in the Figures). An embodiment of the body 205 may comprise: a discharge port 210, configured for receiving the pneumatic fluid from the source and directing the pneumatic fluid away from the body 205. An embodiment of the body 205 may comprise multiple discharge ports 210, which allow discharging of the pneumatic fluid from the emergency pneumatic supply system 200 to multiple components. The body 205 may also comprise a guide tube 215 configured for directing a position of an instrument, such as, but not limiting of, the core 230. The body 205 may also comprise an operational chamber 223, illustrated in FIG. 3, and configured for allowing the pneumatic fluid to travel from the pressure vessel 220 to the at least one discharge port 210.

The emergency pneumatic supply system 200 embodies a hermetically sealed high-pressure gas storage container, such as, but not limiting of, the pressure vessel 220. However, the present invention is not intended to be limited to only using the pressure vessel 220 as the source of the pneumatic fluid. An embodiment of the pressure vessel 220 may have the form of a high-pressure gas storage container, such as, but not limiting of, a pressurized cylinder. An alternate embodiment of the present invention may comprise multiple pressurized cylinders for the pressure vessel 220. Here, the pressurized cylinders may be configured to nearly simultaneously provide the pneumatic fluid to the body 205. Alternatively, the multiple pressurized cylinders may be configured to operate individually.

The pressure vessel 220 may store the pneumatic fluid used to operate the emergency pneumatic supply system 200. The contents of the pressure vessel 220 may comprise, for example, but not limiting of, an ideal gas, or a liquefied gas. A pressure vessel 220 storing an inert ideal gas, such as, but not limiting of, nitrogen or argon; may be preferred for nuclear power plant 10 applications.

The solenoid 225 generally serves as an actuating device for the core 230. However, the present invention is not intended to be limited to only using the solenoid 225 as the actuating device. Other devices and systems, such as, but not limiting of, a mechanical, electro-mechanical, electrical, electro-pneumatic, or the like, may be incorporated into an embodiment of the present invention and function as the actuating device. An embodiment of the solenoid 225 may comprise a nuclear grade solenoid that may be operable inside containment 130. An alternate embodiment of the solenoid 225 may be rated to operate in harsh environment within which an embodiment of the present invention may operate.

An embodiment of the solenoid 225 may comprise a shape allowing for a simple yet secure integration with the emergency pneumatic supply system 200. For example, but not limiting of, the solenoid 225 may comprise a cylindrical shape and have an internal hole that allows for the solenoid 225 to slidably connect with the guide tube 215, as illustrated in FIG. 2.

The core 230 may be considered an instrument that moves through the guide tube 215 and punctures the seal 222, allowing for the pneumatic fluid to flow through the operational chamber 223 and exit the body 205 via the discharge port 210. However, the present invention is not intended to be limited to only using the core 230 as the instrument that functions as just described. An embodiment of the core 230 may comprise a shaft 235, such as, but not limiting of, a stem having a penetrator 240 located at an end. The penetrator 240 may be formed of a material capable of piercing the cap 250 and cap seal 255. An embodiment of the shaft 235 may comprise a removable penetrator 240, allowing for replacement as needed. An embodiment of the core 230 may comprise a spring 245. The spring 245 may serve to position the core 230 away from the seal 222 during normal operation of the BWR. The spring 245 may also serve to position the core 230 at a distance with sufficient force that may prevent inadvertent actuation of the pressure vessel 220 possibly due to vibration, or the like.

The control system 300 may be configured to allow for remote operation of the emergency pneumatic supply system 200. The control system 300 may comprise at least one device that allow for flexible positioning of the control system 300, and for flexible mounting of the emergency pneumatic supply system 200 in an area inside containment 130. An embodiment of the control system 300 may be integrated with a control system that operates nuclear plant components.

Figure 3A:
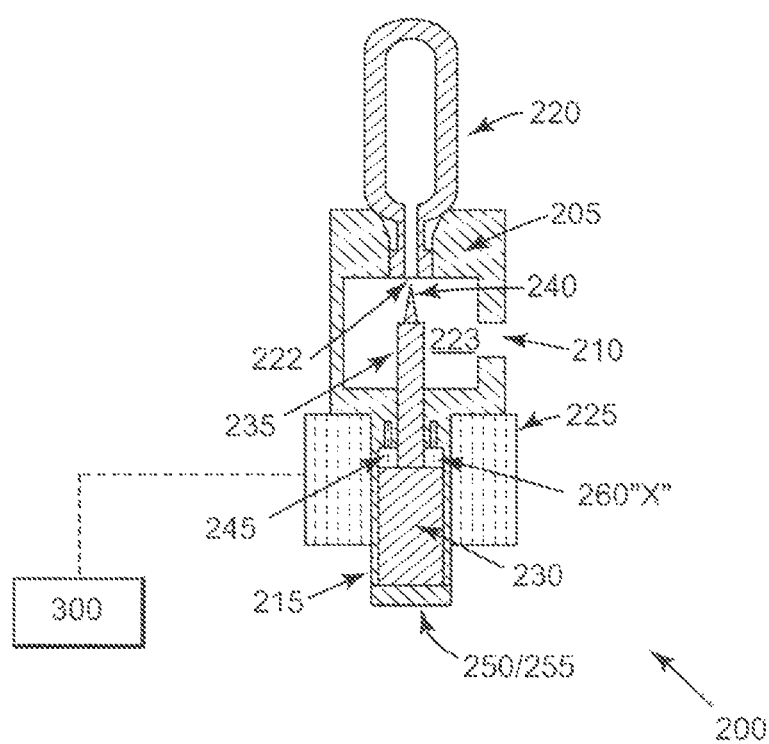
FIGS. 3A and 3B, collectively
Figure 3B:
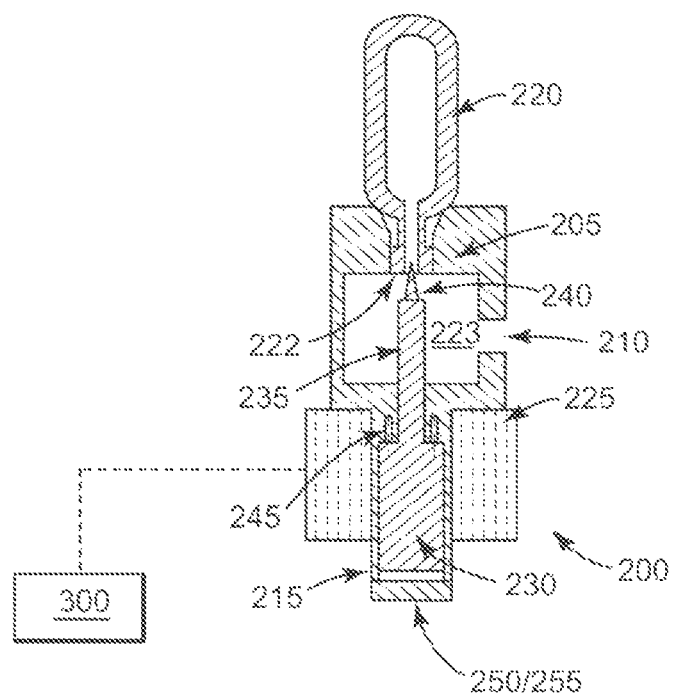

FIGS. 3A and 3B, collectively FIG. 3, are schematics, illustrating an elevation view, partially in cross-section, of the emergency pneumatic supply system 200 of FIG. 2, in accordance with an embodiment of the present invention. FIG. 3, illustrate before and after views of the emergency pneumatic supply system 200 in operation. FIG. 3A illustrates the emergency pneumatic supply system 200 in a normal or ready state. FIG. 3B illustrates the emergency pneumatic supply system 200 after use. FIG. 3 also illustrates how the operational chamber 223 allows for the core 230 to move therein; and for the pneumatic fluid to travel from the pressure vessel 220 to the discharge port 210.

As illustrated in FIG. 3A, in the ready mode the emergency pneumatic supply system 200 may be configured for rapid execution when required. The position of the core 230 may be determined by the spring 245. The size and strength of the spring 245 generally maintains the core 230 at a distance represented by an "X" 260. Distance X 260 may be considered the space required to keep the penetrator 240 from accidentally rupturing the seal 222. Distance X 260 may be large enough to avoid accidental operation, yet small enough to ensure rapid execution of the emergency pneumatic supply system 200.

As illustrated in FIG. 3B, after the control system 300 energizes the solenoid 225, the core 230 is propelled in a manner allowing for the penetrator 240 to pierce the seal 222 of the pressure vessel 220. Next, the pneumatic fluid within the pressure vessel 220 may exit out of the body 205 via the discharge port 210. Furthermore, distance X 260 has closed to approximately zero, indicating that the core 230 has completed the travel through the operational chamber 223 and into the pressure vessel 220, piercing the seal 222.

In use, in an embodiment of the present invention, the penetrator 240 may be attached to the shaft 235, which may also be considered a stem. The shaft may be attached to the core 230. The aforementioned components of the emergency pneumatic supply system 200 may be sized and configured such that when the core 230 is against the cap 250, the penetrator 240 does not engage the seal 222 of the pressure vessel 220. The spring 245 may be sized to maintain the core 230 relatively solid against the cap 250 under reasonable and customary vibration and shock loading conditions. This may prevent the penetrator 240, from prematurely piercing the seal 222 of the pressure vessel 220. The solenoid 225 and guide tube 215 may be sized, configured, and made of a ferromagnetic material. When the coil 225 is energized, a magnetic force may generate across the distance X 260. The magnetic force may be strong enough to pull the core 230 off of the cap 250, compress the spring 245, shrink the distance X 260, and drive the penetrator 240 into the seal 222 of the pressure vessel 220. These actions may release the pressure contained within the pressure vessel 220, as illustrated in FIG. 3B. The pneumatic pressure may then fill the operational chamber 223 of the body 205 and exit via the discharge port 210 to the associated valve actuator. The cap 250 and optional seal 255 serve to prevent a loss of pneumatic supply through the end of the guide tube 215.

Figure 5:
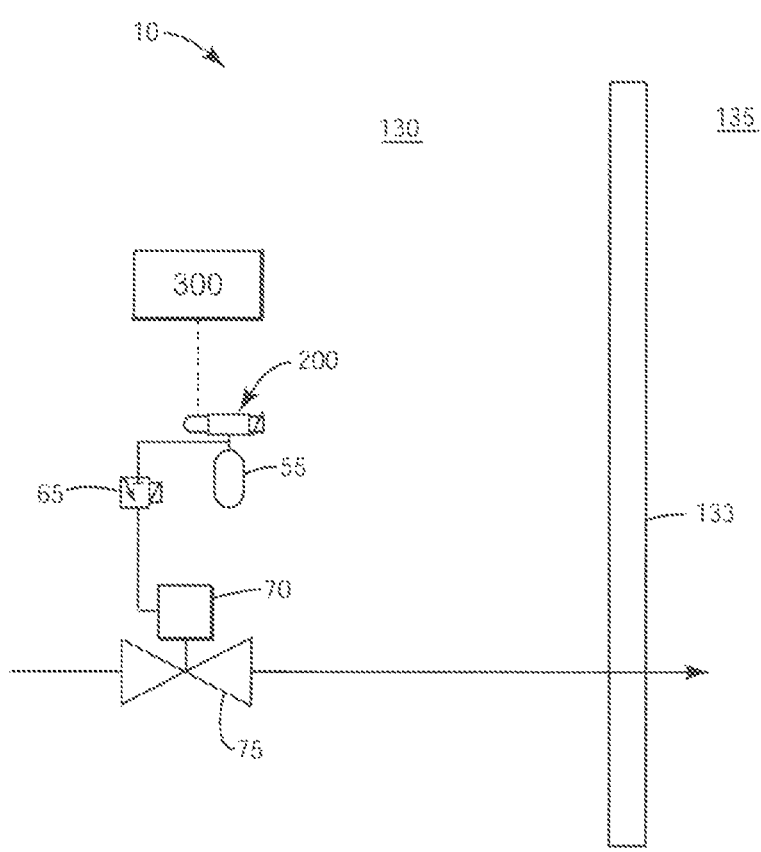
FIG. 5 is a schematic, illustrating an embodiment of the emergency pneumatic supply system within the environment illustrated in FIG. 1.

FIGS. 4 through 7 illustrate non-limiting examples of applications in which the emergency pneumatic supply system 200 may be used. FIG. 4 illustrates an embodiment of the emergency pneumatic supply system 200 incorporated with an accumulator 400. FIG. 5 illustrates the embodiment of FIG. 4, integrated in the environment illustrated in FIG. 1. FIG. 6 illustrates an embodiment of the emergency pneumatic supply system 200 incorporated with a valve positioner 500. FIG. 7 illustrates the embodiment of FIG. 6, integrated in the environment illustrated in FIG. 1.

FIG. 4 is a schematic illustrating an elevation view, partially in section of the emergency pneumatic supply system 200 of FIG. 1 integrated with a first nuclear powerplant system, in accordance with an embodiment of the present invention. Here, the first nuclear system may incorporate an accumulator 400 that may be used to with standard air-operated equipment that cannot withstand the full pressure within the pressurized cylinder 220. The accumulator 400 may comprise: an accumulator mount 410; an accumulator seal 420; and a discharge port 430. The accumulator mount 410 may connect to the body 205 of emergency pneumatic supply system 200. The accumulator seal 420 may be located between the body 205 and the accumulator seal 420. In use, after the control system 300 activates the pneumatic supply system 200, the pneumatic fluid exiting the discharge port 210 may flow into the accumulator 400. In this application, the pressure vessel 220 may be of a size that allows for filling the accumulator 400 during the operation of the emergency pneumatic supply system 200 to a useful and acceptable pressure for standard air operated equipment.

FIG. 5 is a schematic, illustrating an embodiment of the emergency pneumatic supply system within the environment illustrated in FIG. 1. In use, this embodiment of the present invention may be integrated with an air operator 70 of the nuclear power plant 10 designed to operate using an approximately 100 psi of pneumatic pressure. The air operator 70 may be of a type that can operate a component with air or other compressed gases. Some pressure vessels 220, such as, but not limiting of, a pressurized gas cylinder may be filled to a pressure exceeding 1000 psi. This may damage standard air operators 70 that are not designed for this range of high pressures, which may be provided by the pressure vessel 220. The accumulator may be sized large enough allow the operated components to be operated multiple times from a separate control system. The present embodiment of the emergency pneumatic supply system 200 includes the accumulator 400, which may be attached to the discharge port 210 of the emergency pneumatic supply system 200. Here, when the pneumatic fluid is released from the pressure vessel 220, the accumulator 400 may be filled from discharge port 210 through the inlet port 420. The pneumatic fluid may then exit the accumulator 400 through the discharge port 430 to operate a valve 75. The pressure vessel 220 and the accumulator 400 may be sized to allow for a decrease in the pneumatic pressure stored with the pressurized cylinder, or other pressure vessel 220.

FIGS. 6A-6D, collectively FIG. 6, are schematics illustrating plan and sectional views of the emergency pneumatic supply system of FIG. 1 integrated with a second nuclear powerplant system, in accordance with an embodiment of the present invention. FIG. 6 illustrates how the emergency pneumatic supply system 200 may be incorporated with a valve positioner 500 that strokes a valve 510. FIG. 6 illustrates a quarter turn ball valve as an example of a component that may be operated by the pneumatic supply system 200. The pneumatic supply system may be used for any component that uses a pneumatic supply to operate. FIG. 6A and FIG. 6B, which is a cross-section of FIG. 6A, illustrate how a valve positioner 500 may be integrated with the body 205 of the emergency pneumatic supply system 200. Here, the valve 510 is shown in the open position—indicative of the emergency pneumatic supply system 200 in the ready mode as shown for a normally open valve. Alternately, the pneumatic supply system 20 may be used for a valve that has a normally closed position.

FIG. 6C and FIG. 6D, which is a cross-section of FIG. 6C, illustrate how the valve positioner 500 may stroke the normally open valve 510 to the closed position. These FIGS. illustrate that the emergency pneumatic supply system 200 has been operated. Here, the pneumatic fluid exiting the discharge port 210 moves the valve positioner 500, which then changes the position of the valve 510.

FIG. 7 is a schematic, illustrating an alternate embodiment of the emergency pneumatic supply system within the environment illustrated in FIG. 1.

In use, this embodiment of the present invention may be integrated with a valve 75 with an air operator 70, in accordance with the embodiment of the present invention. FIG. 7 illustrates the emergency pneumatic supply system 200 configured to operate a valve 75 using an air operator 70, which is designed to withstand the high pressure contained within the pressurized cylinder 220. An accumulator 400 is not required in this application if the operator 70 is designed for the high pressure within the pressurized cylinder 220. An air operator 70 designed to use the full pressure of a pressurized cylinder 220 has the benefits of being smaller and lighter than standard air operators 70. The components of an embodiment present invention may be formed of any material capable of withstanding the operating environment to which the emergency pneumatic supply system 200 may be exposed.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. Accordingly, we intend to cover all such modifications, omissions, additions and equivalents as may be included within the spirit and scope of the invention as defined by the following claims. For example, but not limiting of, an embodiment of the present invention may comprise different electrical, electro-mechanical, or pneumatic actuator designs; or for nuclear plant components that are not within a containment area.

What is claimed is:

1. An apparatus for providing a pneumatic fluid within a containment area of a nuclear powerplant, the apparatus comprising:
    a pneumatic fluid source including a seal;
    a body connected to the pneumatic fluid source so as to receive the pneumatic fluid from the pneumatic fluid source, wherein the body includes a discharge port;
    an instrument engaged with the body so as to slide along an axis within the body, wherein the instrument includes an end configured to remove the seal, and wherein the instrument includes a core blocked by the body so that the instrument is slidable a limited distance along the axis toward the seal;
    an actuating device configured to drive the instrument the limited distance toward the seal in a first direction along the axis;
    a spring between the body and the core, wherein the spring is configured to drive the instrument in a second direction opposite the first direction and away from the seal so as to maintain the limited distance between the core and the body when the actuating device is not driving the instrument, and wherein the spring is configured to permit the core and the body to come into direct contact that blocks the instrument from sliding beyond the limited distance; and
    an accumulator connected to the discharge port of the body, wherein the accumulator has a volume into which the pneumatic fluid is configured to flow, wherein the volume is configured to reduce the pneumatic fluid to an operating pressure of a component within the containment area, and wherein the accumulator includes an outlet configured to connect the pneumatic fluid at the pressure to the component, wherein the body and the actuating device are locatable within a containment area of a nuclear powerplant.

2. The apparatus of claim 1, wherein the core is maneuverable within the body, and wherein the end of the instrument includes a penetrator formed of a material capable of piercing the seal.

3. The apparatus of claim 2, wherein the penetrator is removable from the instrument.

4. The apparatus of claim 1, wherein the body includes multiple discharge ports.

5. The apparatus of claim 1, wherein the pneumatic fluid source comprises a pressure vessel.

6. The apparatus of claim 1, further comprising:
    a control system for operating the actuating device.

7. A system comprising:
    a nuclear powerplant including a containment area configured to contain a boiling water reactor;
    a primary pneumatic fluid source;
    a pneumatic valve connected to the primary fluid source, wherein the pneumatic valve is configured to be operated with a pneumatic fluid received from the primary fluid source; and
    an emergency pneumatic supply system located within the containment area, wherein the emergency pneumatic supply system includes,
        an emergency pneumatic fluid source including a seal, a body connected to the emergency pneumatic fluid source so as to receive an emergency pneumatic fluid from the pneumatic fluid source, wherein the body includes a discharge port, an instrument engaged with the body so as to slide along an axis within the body, wherein the instrument includes an end configured to remove the seal, and wherein the instrument includes a core blocked by the body so that the instrument is slidable a limited distance along the axis toward the seal, an actuating device configured to drive the instrument the limited distance toward the seal in a first direction along the axis, a spring between the body and the core, wherein the spring is configured to drive the instrument in a second direction opposite the first direction and away from the seal so as to maintain the limited distance between the core and the body when the actuating device is not driving the instrument, and wherein the spring is configured to permit the core and the body to come into direct contact that blocks the instrument from sliding beyond the limited distance, and an accumulator connected to the discharge port of the body, wherein the accumulator has a volume into which the emergency pneumatic fluid is configured to flow, wherein the volume is configured to reduce the emergency pneumatic fluid to an operating pressure of the pneumatic valve, and wherein the accumulator includes an outlet connected to the pneumatic valve so as to connect the pneumatic fluid at the pressure to the pneumatic valve.

8. The system of claim 7, wherein the core is maneuverable within the body, and wherein the end of the instrument includes a penetrator formed of a material capable of piercing the seal.

9. The system of claim 7, wherein the body includes multiple discharge ports.

10. The system of claim 7, wherein the emergency pneumatic fluid source comprises a pressure vessel.

11. The system of claim 7, further comprising:
a control system for controlling the operation of the emergency pneumatic supply system.

12. The apparatus of claim 1, wherein the actuating device is a solenoid, and wherein the core is inside of the solenoid so at to be directly driven by the solenoid when actuated.

13. The apparatus of claim 1, further comprising:
the component within the containment area of the nuclear powerplant, wherein the component is fluidly connected to the pneumatic fluid source and the accumulator, and wherein the component is operable with the pneumatic fluid at the pressure received from the body.

14. The apparatus of claim 13, wherein the component is an air-operated valve operable with the pneumatic fluid at the pressure.

15. The system of claim 7, wherein the actuating device is a solenoid, and wherein the core is inside of the solenoid so at to be directly driven by the solenoid when actuated.

\* \* \* \* \*

UNITED STATES PATENT AND TRADEMARK OFFICE
CERTIFICATE OF CORRECTION

PATENT NO. : 9,601,222 B2  Page 1 of 1
APPLICATION NO. : 12/629337
DATED : March 21, 2017
INVENTOR(S) : Roit et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1455 days.

Signed and Sealed this

Twenty-fifth Day of September, 2018

Andrei Iancu
*Director of the United States Patent and Trademark Office*